United States Patent
Ye (10) Patent No.: US 11,294,519 B2
(45) Date of Patent: Apr. 5, 2022

(54) TOUCH PANEL

(71) Applicant: Wuhan China Star Optoelectronics Semiconductor Display Technology Co., Ltd., Hubei (CN)

(72) Inventor: Jian Ye, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 197 days.

(21) Appl. No.: 16/615,400

(22) PCT Filed: Jun. 25, 2019

(86) PCT No.: PCT/CN2019/092776
§ 371 (c)(1),
(2) Date: Nov. 20, 2019

(87) PCT Pub. No.: WO2020/224039
PCT Pub. Date: Nov. 12, 2020

(65) Prior Publication Data
US 2021/0311589 A1 Oct. 7, 2021

(30) Foreign Application Priority Data
May 5, 2019 (CN) .......................... 201910368948.5

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0448* (2019.05);
(Continued)

(58) Field of Classification Search
CPC .... G06F 3/0445; G06F 3/0412; G06F 3/0448; G06F 2203/04111; G06F 2203/04112
See application file for complete search history.

(56) References Cited

U.S. PATENT DOCUMENTS

| 10,901,567 B2* | 1/2021 | Lee ..................... G06F 3/0443 |
| 2014/0043252 A1* | 2/2014 | Kim ..................... G06F 3/0448 |
| | | 345/173 |

(Continued)

*Primary Examiner* — Sahlu Okebato
(74) *Attorney, Agent, or Firm* — Hamre, Schumann, Mueller & Larson, P.C.

(57) ABSTRACT

The present disclosure provides a touch panel comprising a touch electrode layer provided with a mesh-shaped groove on an entire surface thereof. The mesh-shaped groove comprises strip-shaped grooves arranged to cross each other. The mesh-shaped groove divides the touch electrode layer into a plurality of conductive units arranged in an array. The conductive units located in a same electrode pattern in the touch electrode layer are electrically connected together by providing a groove break in each of the strip-shaped grooves among them. The mesh-shaped groove relates to inside and outside of different electrode patterns in the entire touch electrode layer, thereby blurring boundary shape of each electrode pattern and decreasing difference in shape and vision between different electrode patterns. This makes the entire touch electrode layer have a uniform surface, thereby reducing probability of seeing electrode patterns in the touch panel and improving visual effect of the touch panel.

8 Claims, 5 Drawing Sheets

(52) U.S. Cl.
CPC ............ *G06F 2203/04111* (2013.01); *G06F 2203/04112* (2013.01)

(56) References Cited

U.S. PATENT DOCUMENTS

| | | | |
|---|---|---|---|
| 2015/0301632 A1* | 10/2015 | Hirata | G06F 3/0446 345/173 |
| 2016/0139728 A1* | 5/2016 | Jeon | G06F 3/0448 345/173 |

* cited by examiner

TOUCH PANEL

FIELD OF INVENTION

The present disclosure relates to a field of touch display technology, and particularly to a touch panel.

BACKGROUND

In flat panel display technologies, organic light-emitting diode (OLED) displays have many advantages such as lightness, thin profile, active illumination, fast response times, wide viewing angles, wide color gamut, high brightness, and low power consumption and can be prepared into flexible screens. Therefore, OLED displays have aroused great interest in scientific research and industry, and have gradually become a third generation display technology after liquid crystal displays (LCDs).

Furthermore, with development of portable electronic display devices, touch panels provide new human-computer interaction interfaces, which are more direct and more user-friendly in use. Touch panels and flat panel display devices are integrated to form touch display devices, which enables flat panel display devices to have touch functions and to be inputted by a finger, a stylus, or the like, and makes operations of flat panel display devices more intuitive and simple.

Currently, more commonly used touch technologies comprise resistive touch panels and capacitive touch panels. However, considering the controllability, ease of use, and surface appearance, most users will choose capacitive touch panels as their best choice. In current development of OLED touch display technology, in view of difficulty of process, an external touch technology in which a touch sensor is disposed on an OLED layer is generally adopted. Specific process is as follows: fabricating a TFT layer comprising a substrate first, then forming an OLED layer on the TFT layer, forming an encapsulation layer on the OLED layer, and forming a touch function layer on the encapsulation layer finally. The touch function layer generally comprises a first insulating layer, a bridge layer, a second insulating layer, an electrode circuit layer, and an organic protective layer which are sequentially disposed from bottom to top. The bridge layer comprises a plurality of conductive bridges in pixel regions. The electrode circuit layer comprises touch driving electrodes (Txs) and touch sensing electrodes (Rxs). The touch driving electrodes or the touch sensing electrodes are connected to the conductive bridges through contact holes penetrating through the second insulating layer.

Currently, materials of touch electrodes that have been developed and applied mainly comprise indium tin oxide (ITO), silver nanowires (SNW), and metal mesh. Touch conductive electrodes composed of metal mesh usually tend to cause Moiré interference pattern to be very obvious due to their thicker pattern line widths (pattern line widths are more than 5 μm), so they are only suitable for display screens with long observation distances. Touch conductive electrodes composed of SNW generally have a problem of high haze, and haze will increase with use time and have higher manufacturing costs. As a current mainstream material of touch electrodes, ITO has high transmittance and better electrical conductivity. Touch electrode patterns composed of ITO are usually formed by a yellow light etching process. ITO conductive material in some regions is removed by a yellow light etching process to form electrically independent touch driving electrodes and touch sensing electrodes.

Current touch electrode patterns, whether they are mutual-capacitance touch sensors or self-capacitance touch sensors, are shaped as regular shapes such as squares and rhombuses. Due to difference in optical characteristics such as reflectance of regions where ITO is etched and regions where ITO is not etched, ITO touch electrode patterns are easily seen by human eyes, especially boundary position of effective touch electrodes Tx and Rx. This affects overall visual effects of display screens. Touch electrode patterns based on single ITO (SITO), especially strip-shaped conductive bridges, are often more easily perceived by human eyes.

SUMMARY OF DISCLOSURE

An object of the present disclosure is to provide a touch panel that reduces probability of seeing electrode patterns in the touch panel and improves visual effect of the touch panel.

To achieve the above object, the present disclosure provides a touch panel comprising a touch electrode layer provided with a mesh-shaped groove on an entire surface thereof, wherein the mesh-shaped groove comprises strip-shaped grooves arranged to cross each other, and the mesh-shaped groove divides the touch electrode layer into a plurality of conductive units arranged in an array;

the touch electrode layer comprises a plurality of spaced electrode patterns, the conductive units located in a same electrode pattern are electrically connected to each other by providing a groove break in each of the strip-shaped grooves among them;

the plurality of electrode patterns comprise a plurality of first touch electrodes disposed along a first direction and a plurality of second touch electrodes disposed along a second direction and insulated from and intersecting the plurality of first touch electrodes;

each of the first touch electrodes comprises a plurality of first touch units and a connection unit connecting adjacent two first touch units; and each of the second touch electrodes comprises a plurality of independent second touch units spaced apart by the plurality of first touch electrodes.

In an embodiment, the strip-shaped grooves are shaped as waves.

In an embodiment, the touch panel further comprising a bridge layer stacked on the touch electrode layer, wherein the bridge layer comprises a plurality of conductive bridges at positions corresponding to intersections of the first touch electrodes and the second touch electrodes;

two ends of each of the conductive bridges are respectively connected to two adjacent second touch units in a same second touch electrode, thereby electrically connecting the two second touch units; and each of the conductive bridges is disposed above and extends along the corresponding strip-shaped groove.

In an embodiment, each of the conductive bridges is provided with a spacing recess at a position corresponding to one of the strip-shaped grooves.

In an embodiment, the first touch units and the second touch units are shaped as rhombuses.

In an embodiment, each of the strip-shaped grooves has a width of 5-50 μm.

In an embodiment, each of the strip-shaped grooves has a width of 5-25 μm.

In an embodiment, the plurality of electrode patterns further comprises a plurality of floating electrodes respectively disposed in the first touch units and the second touch units.

In an embodiment, the touch electrode layer is composed of a transparent conductive material.

In an embodiment, the touch electrode layer is composed of indium tin oxide.

The present disclosure provides a touch panel comprising a touch electrode layer provided with a mesh-shaped groove on an entire surface thereof. The mesh-shaped groove comprises strip-shaped grooves arranged to cross each other. The mesh-shaped groove divides the touch electrode layer into a plurality of conductive units arranged in an array. The conductive units located in a same electrode pattern in the touch electrode layer are electrically connected together by providing a groove break in each of the strip-shaped grooves among them. The mesh-shaped groove relates to inside and outside of different electrode patterns in the entire touch electrode layer, thereby blurring boundary shape of each electrode pattern and decreasing difference in shape and vision between different electrode patterns. This makes the entire touch electrode layer have a uniform surface, thereby reducing probability of seeing electrode patterns in the touch panel and improving visual effect of the touch panel.

In order to further understand features and technical contents of the present disclosure, please refer to following detailed description and accompanying drawings of the present disclosure. The accompanying drawings only are used for reference and description and are not intended to limit the present disclosure.

BRIEF DESCRIPTION OF DRAWINGS

In the following, with reference to accompanying drawings, concrete embodiments of the invention will be described in detail to make technical solutions and other beneficial effects of the invention more clear.

DETAILED DESCRIPTION

In order to further illustrate technical solutions and effects of the present disclosure, preferred embodiments of the present disclosure with reference to accompanying drawings will be described below in detail.

Figure 1:
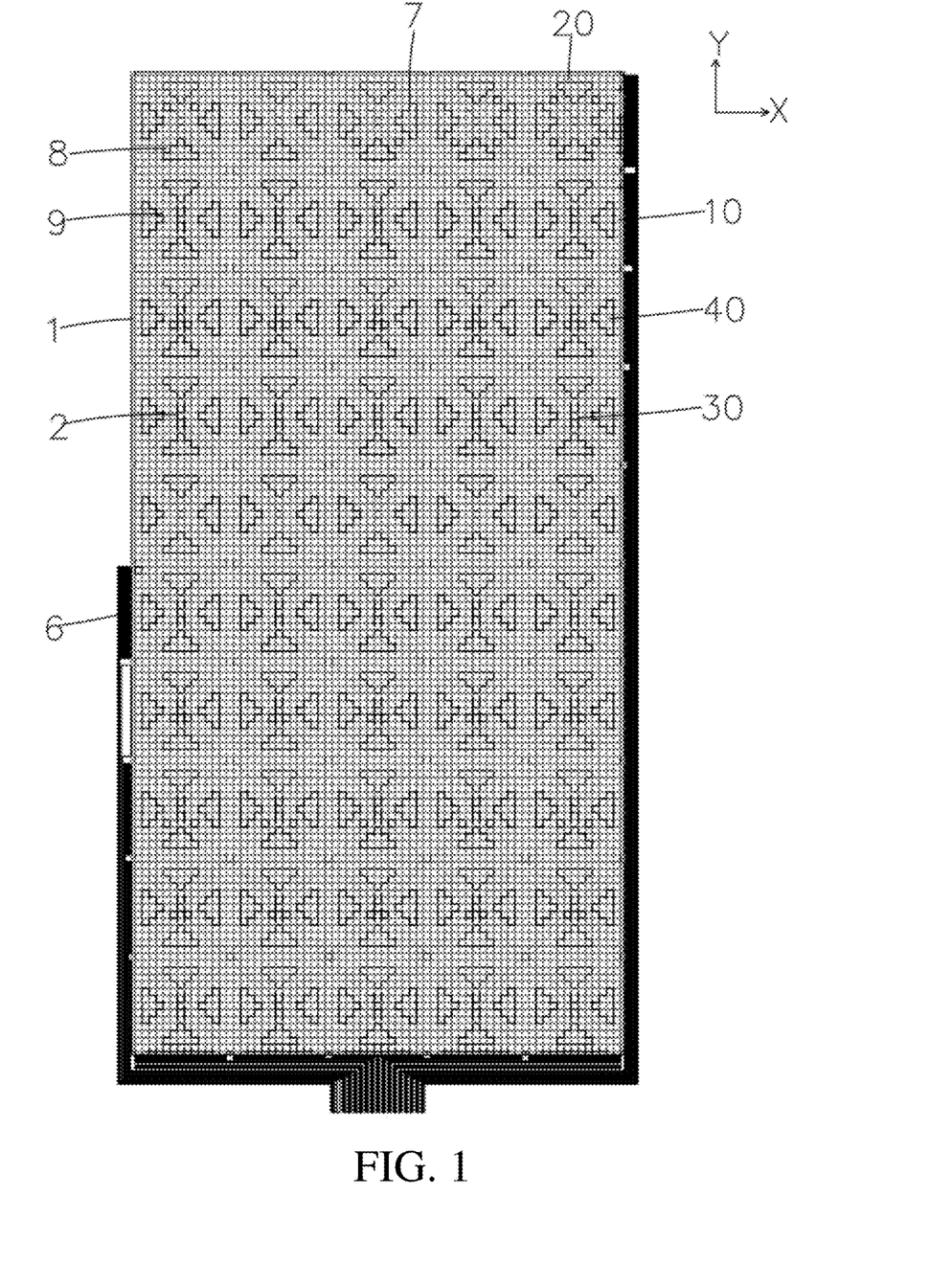
FIG. 1 is a schematic plan view of a touch panel according to the present disclosure.

Please refer to FIG. 1, which is a touch panel according to the present disclosure. The touch panel comprises a touch electrode layer 1, an insulating layer (not shown), a bridge layer 2, and an edge trace 6 which are sequentially stacked. The edge electrode 6 is disposed in a same layer as the touch electrode layer 1 and connects the touch electrode layer 1 to a circuit bonding region.

Specifically, the touch electrode layer 1 is provided with a mesh-shaped groove 9 on an entire surface thereof. The mesh-shaped groove 9 divides the touch electrode layer 1 into a plurality of conductive units 8 arranged in an array. The mesh-shaped groove 9 comprises strip-shaped grooves 95 arranged to cross each other.

Figure 2:
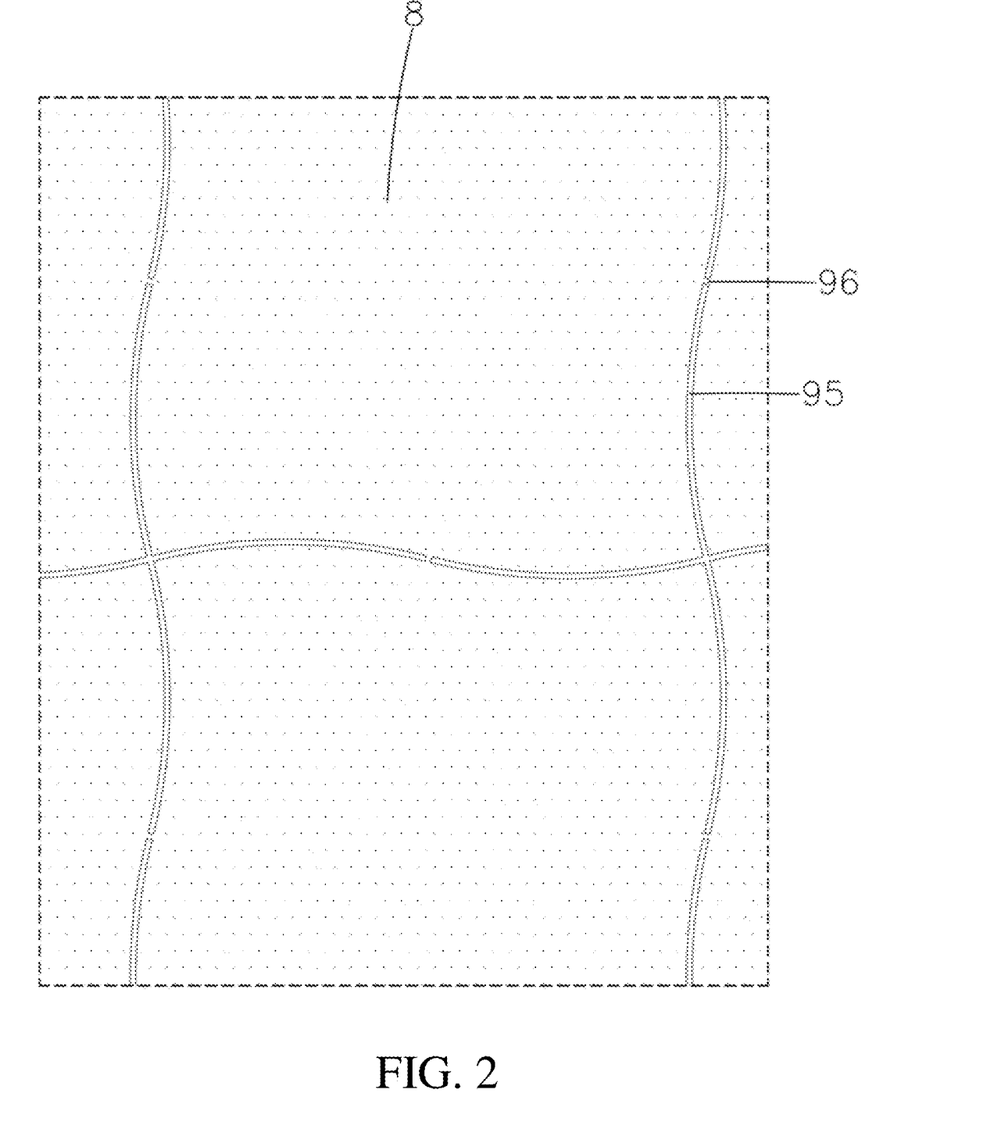
FIG. 2 is a schematic view of electrical connection of two adjacent conductive units in a same electrode pattern in a touch panel according to the present disclosure.

Specifically, as shown in FIG. 2, the touch electrode layer 1 comprises a plurality of electrically independent spaced electrode patterns 7. The conductive units 8 located in a same electrode pattern 7 are electrically connected to each other by providing a groove break 96 in each of the strip-shaped grooves 95 among them.

The mesh-shaped groove 9 relates to inside and outside of different electrode patterns 7 in the entire touch electrode layer 1. That is, the electrode patterns 7 have the strip-shaped grooves 95 formed by an etching process inside and outside thereof. The strip-shaped grooves 95 inside and outside the electrode patterns 7 are similar in shape and parallel so that shapes of strip-shaped grooves 95 inside the electrode patterns 7 are the same as shapes of boundary of the electrode patterns 7. This reduces difference in reflectance between the inside and the outside of the electrode patterns 7, thereby blurring boundary shape of each electrode pattern 7 and decreasing difference in shape and vision between different electrode patterns 7. Therefore, the entire touch electrode layer 1 has a uniform surface, thereby reducing probability of seeing electrode patterns 7 in the touch panel and improving visual effect of the touch panel.

Specifically, the plurality of electrode patterns 7 comprise a plurality of first touch electrodes 10 disposed along a first direction X, a plurality of second touch electrodes 20 disposed along a second direction Y and insulated from and intersecting the plurality of first touch electrodes 10, and a plurality of dummy electrodes 40.

Figure 3:
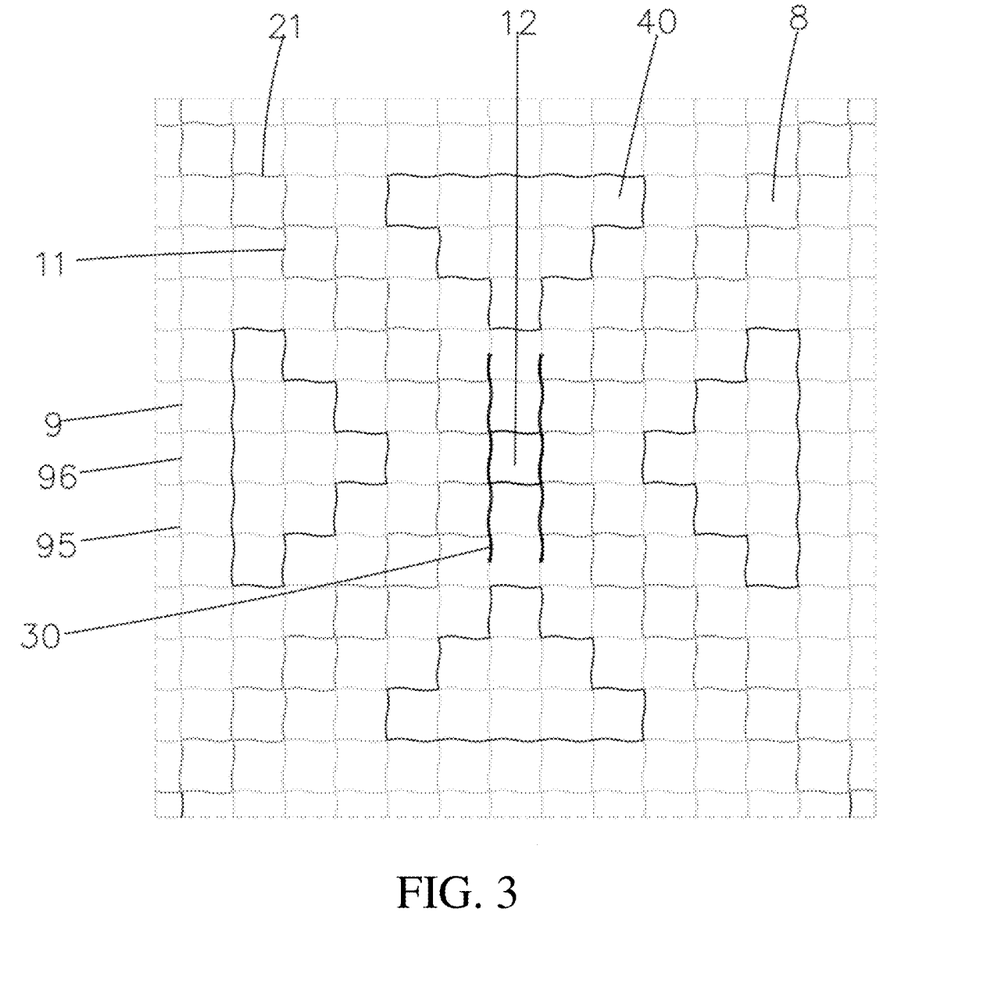
FIG. 3 is an enlarged schematic view of a staggered position of a first touch electrode and a second touch electrode in a touch panel according to the present disclosure.
Figure 4:
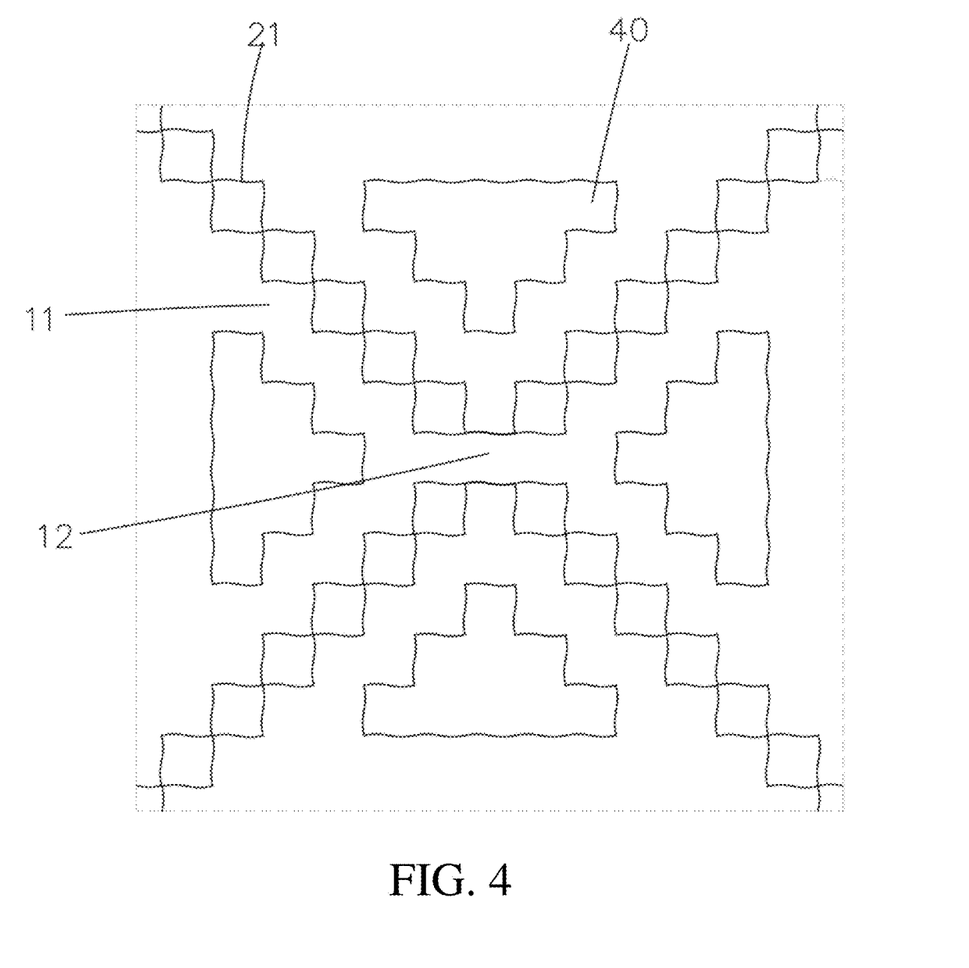
FIG. 4 is a schematic view of outlines of electrode patterns of FIG. 3.

Specifically, as shown in FIG. 3 and FIG. 4, each of the first touch electrodes 10 comprises a plurality of first touch units 11 and a connection unit 12 connecting adjacent two first touch units 11.

Specifically, each of the second touch electrodes 20 comprises a plurality of independent second touch units 21 spaced apart by the plurality of first touch electrodes 10.

Specifically, the insulating layer may be stacked on or below the touch electrode layer 1, and may be disposed to cover an entire surface of the touch electrode layer 1 or only at positions corresponding to intersections of the first touch electrodes 10 and the second touch electrodes 20.

Specifically, the bridge layer 2 comprises a plurality of conductive bridges 31 at positions corresponding to intersections of the first touch electrodes 10 and the second touch electrodes 20. Two ends of each of the conductive bridges 31 are respectively connected to two adjacent second touch units 21 in a same second touch electrode 20, thereby electrically connecting the two second touch units 21.

Specifically, the insulating layer is provided with contact holes 39 at positions corresponding to ends of the conductive bridges 31. The conductive bridges 31 are connected to the second touch units 21 through the contact holes 39. The second touch electrodes 20 spaced apart on the insulating layer are connected to each other by the conductive bridges 31.

Specifically, the first touch electrode 10 is one of a touch driving electrode and a touch sensing electrode, and the second touch electrode 20 is the other one of a touch driving electrode and a touch sensing electrode.

Figure 5:
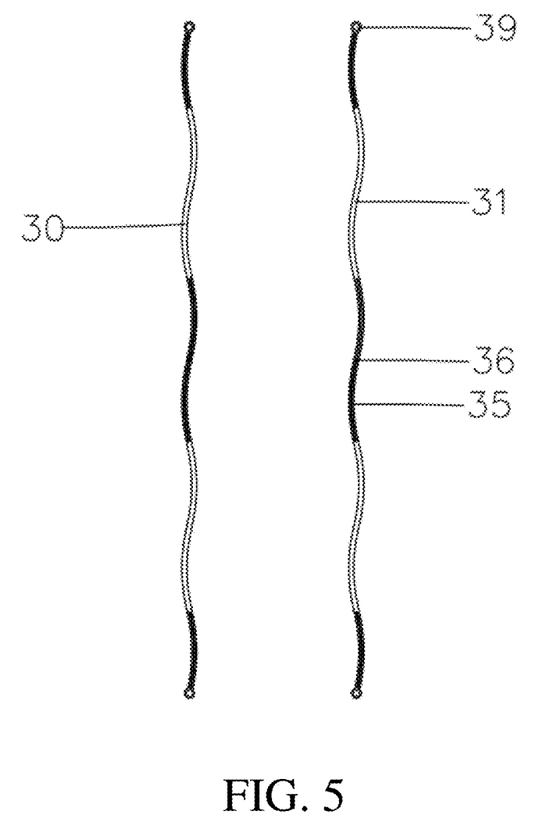
FIG. 5 is an enlarged schematic view of conductive bridges of FIG. 3.

Preferably, as shown in FIG. 5, each of the conductive bridges 31 is disposed above and extends along the corresponding strip-shaped groove 95 such that the conductive bridges 31 have same boundary shapes as the electrode patterns 7 of the touch electrode layer 1. Therefore, difference in shape between each conductive bridge 31 and each electrode pattern 7 in the touch electrode layer 1 is decreased, and visibility of the conductive bridges 31 is reduced.

Specifically, two parallel conductive bridges 31 are disposed between adjacent two second touch units 21 in a same second touch electrode 20 to be connected to the two second touch units 21.

Preferably, the strip-shaped grooves 95 are shaped as waves, so that edge of each electrode pattern 7 in the touch electrode layer 1 is wavy. Therefore, boundary of each electrode pattern 7 in the touch electrode layer 1 is blurred. Because the conductive bridges 31 extend along the strip-shaped grooves 95, the conductive bridges 31 are also wavy. Therefore, difference in visibility between each conductive bridge 31 and each electrode pattern 7 in the touch electrode layer 1 is decreased, and probability of seeing the conductive bridges 31 is reduced.

Preferably, each of the conductive bridges 31 is provided with a spacing recess 35 and a recess break 36 at positions respectively corresponding to the strip-shaped groove 95 and the groove break 96 in the touch electrode layer 1. Therefore, difference between each conductive bridge 31 and each electrode pattern 7 in the touch electrode layer 1 is decreased, and the visibility of the conductive bridges 31 is further reduced.

Specifically, the first touch units 11 and the second touch units 21 may be shaped as rhombuses, squares, or the like.

Specifically, function of the dummy electrodes 40 in the touch panel is mainly to improve optical consistency, so as to reduce probability of seeing the electrode patterns 7 in the touch electrode layer 1 and capacitance values required to match a touch driving IC. Therefore, locations and areas of the dummy electrodes 40 can be set according to requirements of the touch driving IC.

Specifically, in this embodiment, the plurality of dummy electrodes 40 are respectively disposed in the first touch units 11 and the second touch units 21.

Specifically, the strip-shaped grooves 95 have a width of 5-50 μm. The width may be selected depending on capability of etching process. Preferably, the width of the strip-shaped grooves 95 is 20 μm or less.

Furthermore, width of the groove breaks 96 coincides with the width of the strip-shaped grooves 95, which is 5-50 μm.

Specifically, the touch electrode layer 1 is composed of a transparent conductive material, indium tin oxide.

In a touch panel provided by the present disclosure, a wavy mesh-shaped groove 9 is formed on an entire surface of a touch electrode layer 1 by an etching process and partitions the entire surface of the touch electrode layer 1 into a plurality of conductive units 8 arranged in an array. If the mesh-shaped groove 9 is a continuous etching groove, that is, all strip-shaped grooves 95 thereof are connected to each other, the entire surface of the touch electrode layer 1 will be divided into a plurality of small conductive units 8 that are electrically independent of each other. The conductive units 8 located in a same electrode pattern 7 are electrically connected to each other by providing groove breaks 96 at specific positions in the strip-shaped grooves 95. The conductive cells 8 located in the same electrode pattern 7 are electrically connected by providing the groove breaks 96 in the strip-shaped grooves 95 at a specific position, thereby forming a plurality of electrode patterns 7 that are electrically independent of each other. The mesh-shaped groove 9 relates to inside and outside of different electrode patterns 7 in the entire touch electrode layer 1.

That is, the electrode patterns 7 have the strip-shaped grooves 95 inside and outside thereof. The strip-shaped grooves 95 inside and outside the electrode patterns 7 are similar in shape and parallel so that shapes of strip-shaped grooves 95 inside the electrode patterns 7 are the same as shapes of boundary of the electrode patterns 7. This reduces difference in reflectance between the inside and the outside of the electrode patterns 7, thereby blurring boundary shape of each electrode pattern 7 and decreasing difference in shape and vision between different electrode patterns 7. Therefore, the entire touch electrode layer 1 has a uniform surface, thereby reducing probability of seeing electrode patterns 7 in the touch panel and improving visual effect of the touch panel.

In the above, the present disclosure provides a touch panel comprising a touch electrode layer provided with a mesh-shaped groove on an entire surface thereof. The mesh-shaped groove comprises strip-shaped grooves arranged to cross each other. The mesh-shaped groove divides the touch electrode layer into a plurality of conductive units arranged in an array. The conductive units located in a same electrode pattern in the touch electrode layer are electrically connected together by providing a groove break in each of the strip-shaped grooves among them. The mesh-shaped groove relates to inside and outside of different electrode patterns in the entire touch electrode layer, thereby blurring boundary shape of each electrode pattern and decreasing difference in shape and vision between different electrode patterns. This makes the entire touch electrode layer have a uniform surface, thereby reducing probability of seeing electrode patterns in the touch panel and improving visual effect of the touch panel.

Based on the above description, those skilled in the art may make various variations and modifications according to technical solutions and technical concept of the present disclosure, and all variations and modifications should fall within scope of appended claims of the present disclosure.

What is claimed is:

1. A touch panel, comprising:
a touch electrode layer provided with a mesh-shaped groove on an entire surface thereof, wherein the mesh-shaped groove comprises strip-shaped grooves shaped as waves, arranged to cross each other, and dividing the touch electrode layer into a plurality of conductive units arranged in an array, the touch electrode layer comprises a plurality of spaced electrode patterns, each of the strip-shaped grooves among the conductive units in the electrode patterns is provided with a groove break, the conductive units in a same electrode pattern, each of the electrode patterns comprises a plurality of first touch electrodes disposed along a same direction and a plurality of second touch electrodes insulated from and intersecting the first touch electrodes, each of the first touch electrodes comprises a plurality of first touch units and a connection unit connecting two adjacent first touch units, and each of the second touch electrodes comprises a plurality of independent second touch units spaced apart by the first touch electrodes;
an insulating layer covering an entire surface of the touch electrode layer; and
a bridge layer disposed on the insulating layer and comprising a plurality of conductive bridges, wherein the conductive bridges are disposed at positions corresponding to intersections of the first touch electrodes and the second touch electrodes and are disposed above and extends along corresponding strip-shaped grooves, the insulating layer is provided with contact holes corresponding to ends of the conductive bridges, two ends of each of the conductive bridges are respectively connected to two adjacent second touch units in a same second touch electrode through the contact holes, and each of the conductive bridges is provided with a spacing recess corresponding to one strip-shaped groove.

2. The touch panel according to claim 1, wherein each of the conductive bridges is further provided with a recess break corresponding to one groove break.

3. The touch panel according to claim 1, wherein the first touch units and the second touch units are shaped as rhombuses.

4. The touch panel according to claim 1, wherein each of the strip-shaped grooves has a width of 5-50 μm.

5. The touch panel according to claim 1, wherein each of the strip-shaped grooves has a width of 5-25 μm.

6. The touch panel according to claim 1, wherein the plurality of electrode patterns further comprises a plurality of floating electrodes respectively disposed in the first touch units and the second touch units.

7. The touch panel according to claim 1, wherein the touch electrode layer is composed of a transparent conductive material.

8. The touch panel according to claim 7, wherein the touch electrode layer is composed of indium tin oxide.

* * * * *